March 25, 1952 C. L. MOYER 2,590,198
FEED AND TRANSFER MECHANISM FOR BOOK-TRIMMING MACHINES
Original Filed Dec. 22, 1947 10 Sheets-Sheet 1
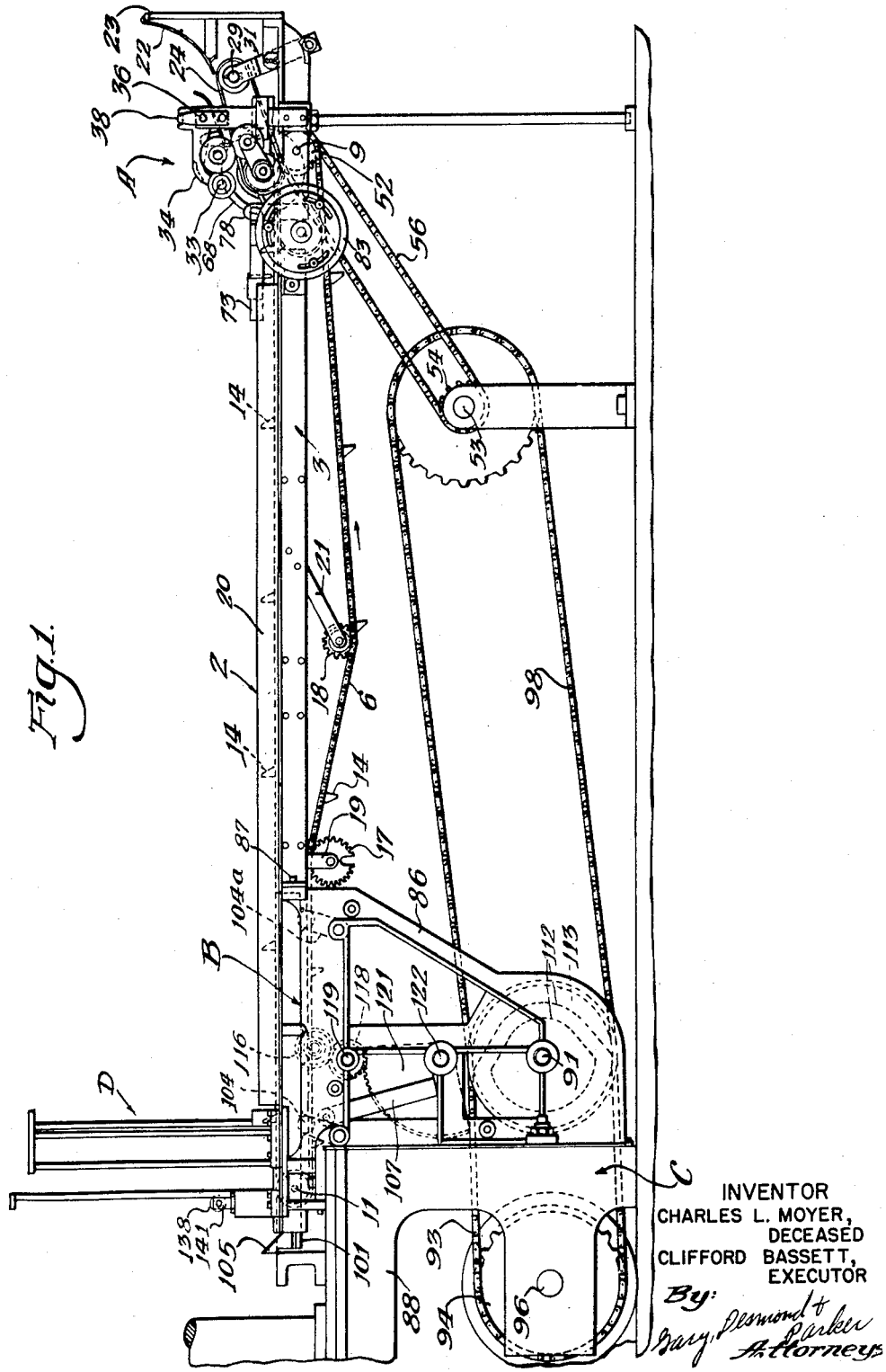
INVENTOR
CHARLES L. MOYER,
DECEASED
CLIFFORD BASSETT,
EXECUTOR March 25, 1952 C. L. MOYER 2,590,198
FEED AND TRANSFER MECHANISM FOR BOOK-TRIMMING MACHINES
Original Filed Dec. 22, 1947 10 Sheets-Sheet 2
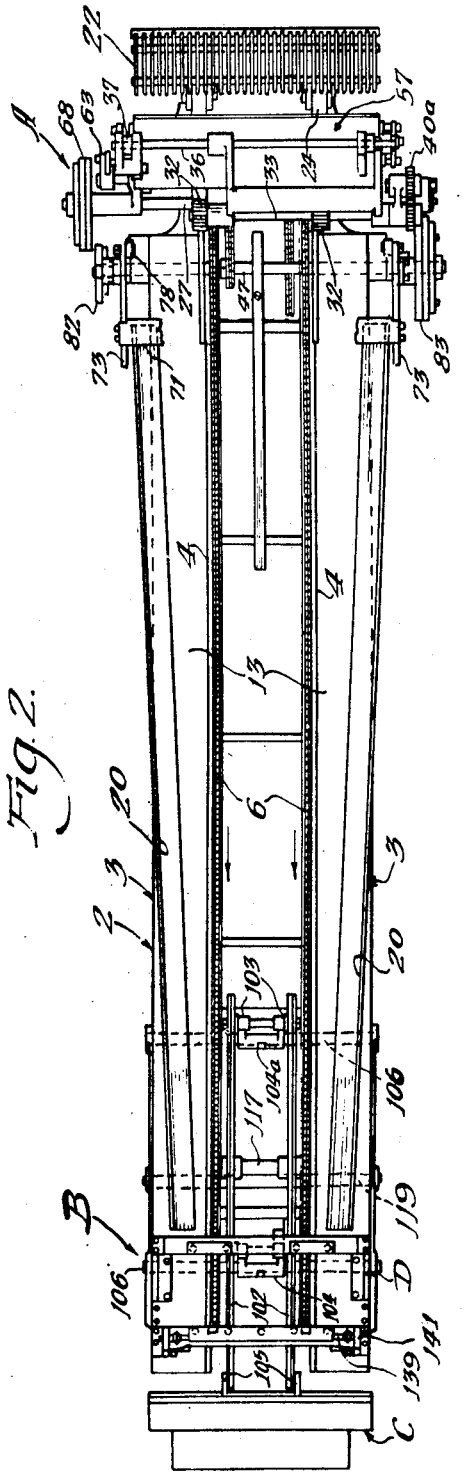
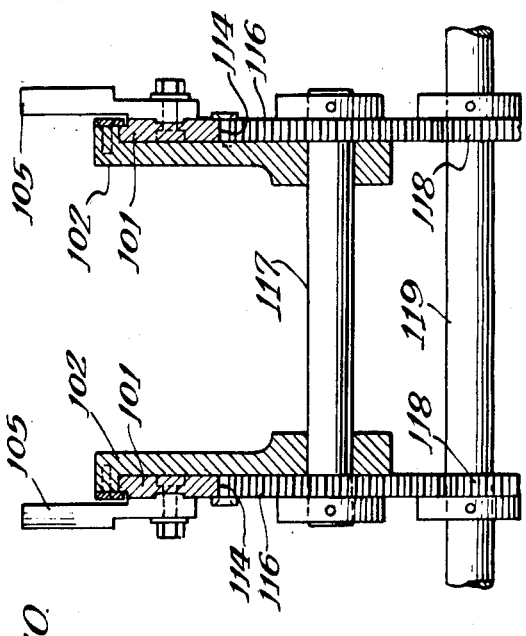
INVENTOR
CHARLES L. MOYER, DECEASED
CLIFFORD BASSETT, EXECUTOR March 25, 1952 C. L. MOYER 2,590,198
FEED AND TRANSFER MECHANISM FOR BOOK-TRIMMING MACHINES
Original Filed Dec. 22, 1947 10 Sheets-Sheet 3

INVENTOR
CHARLES L. MOYER, DECEASED
CLIFFORD BASSETT, EXECUTOR
By
Gary, Desmond & Parker
Attorneys

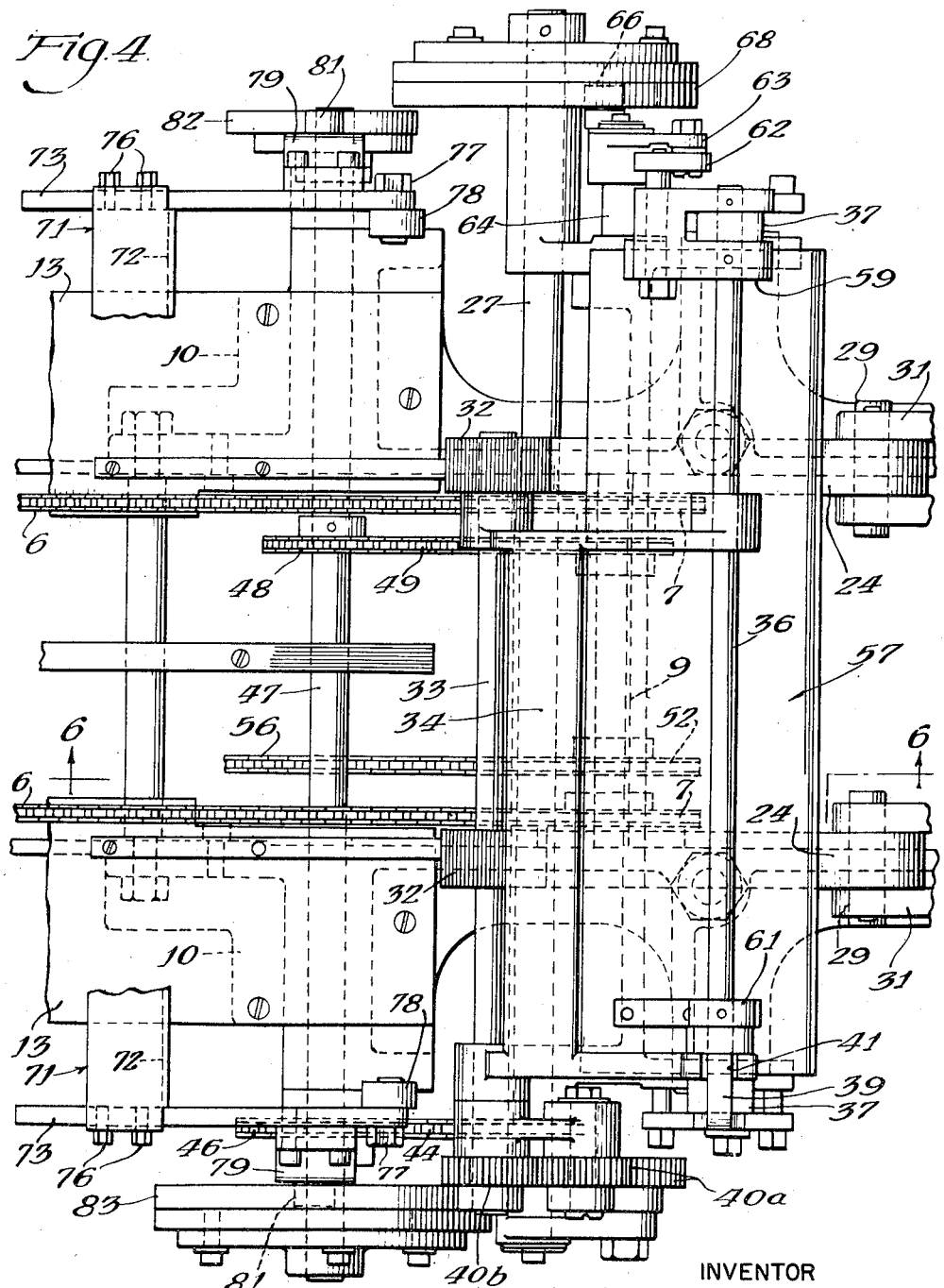

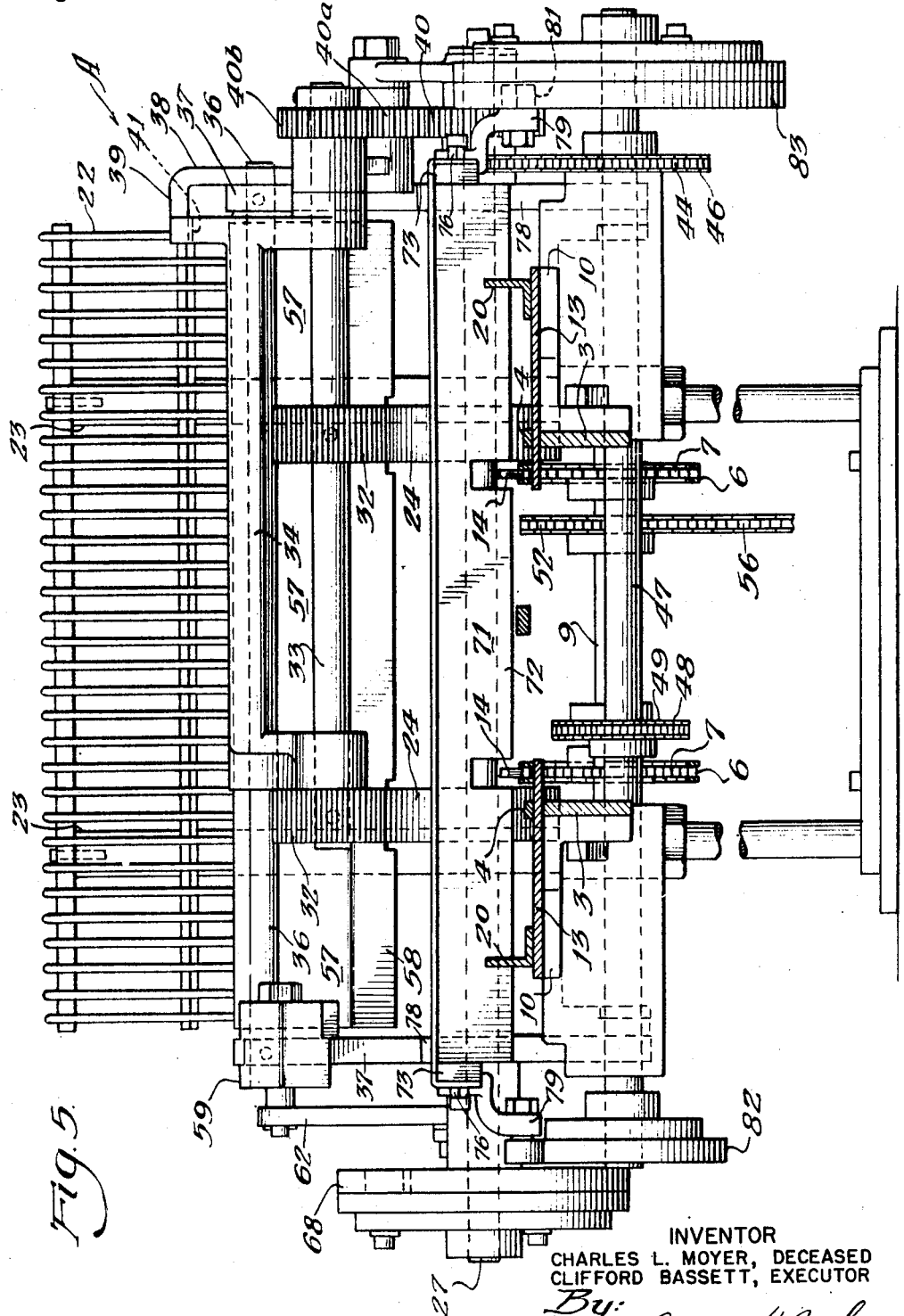

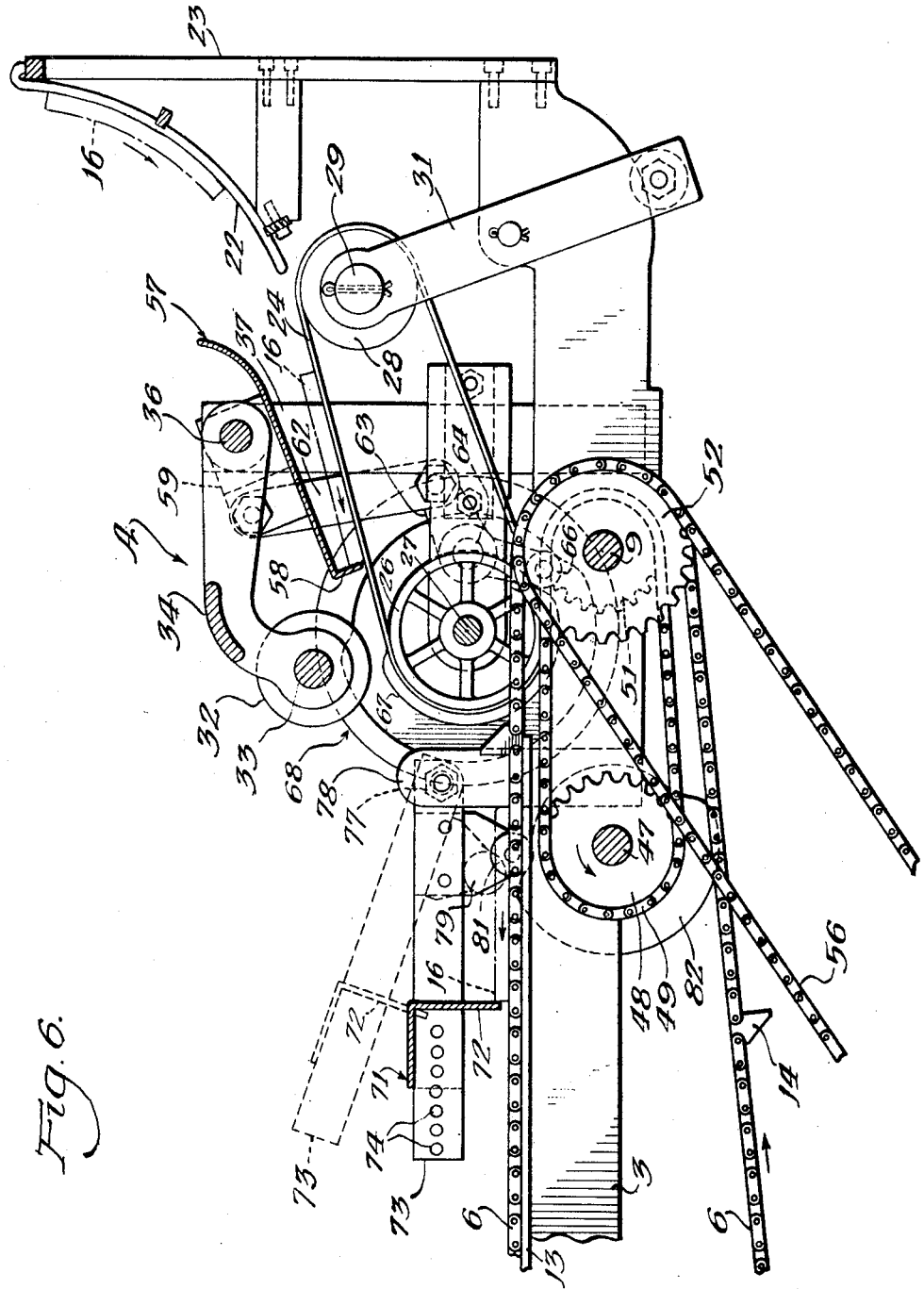

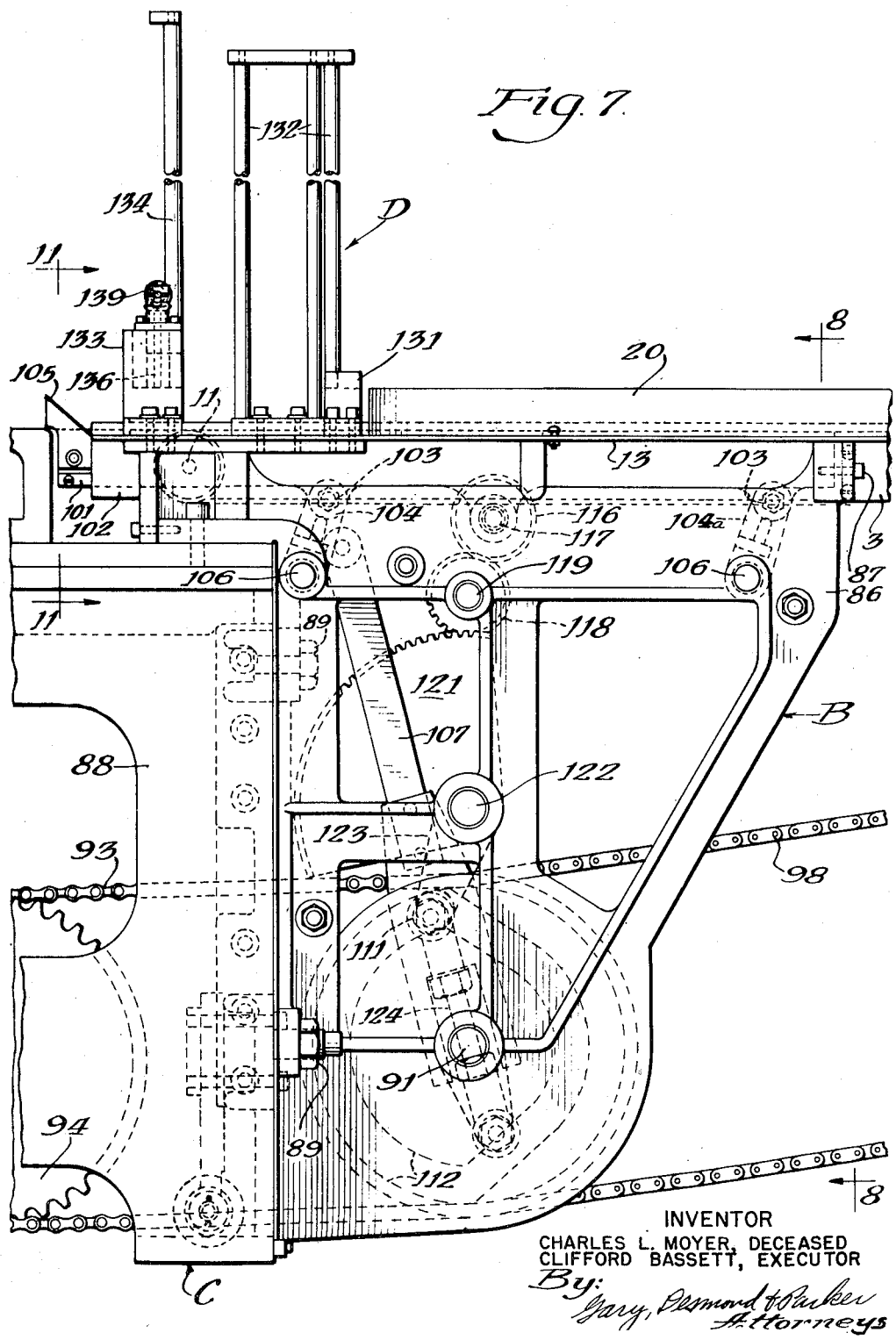

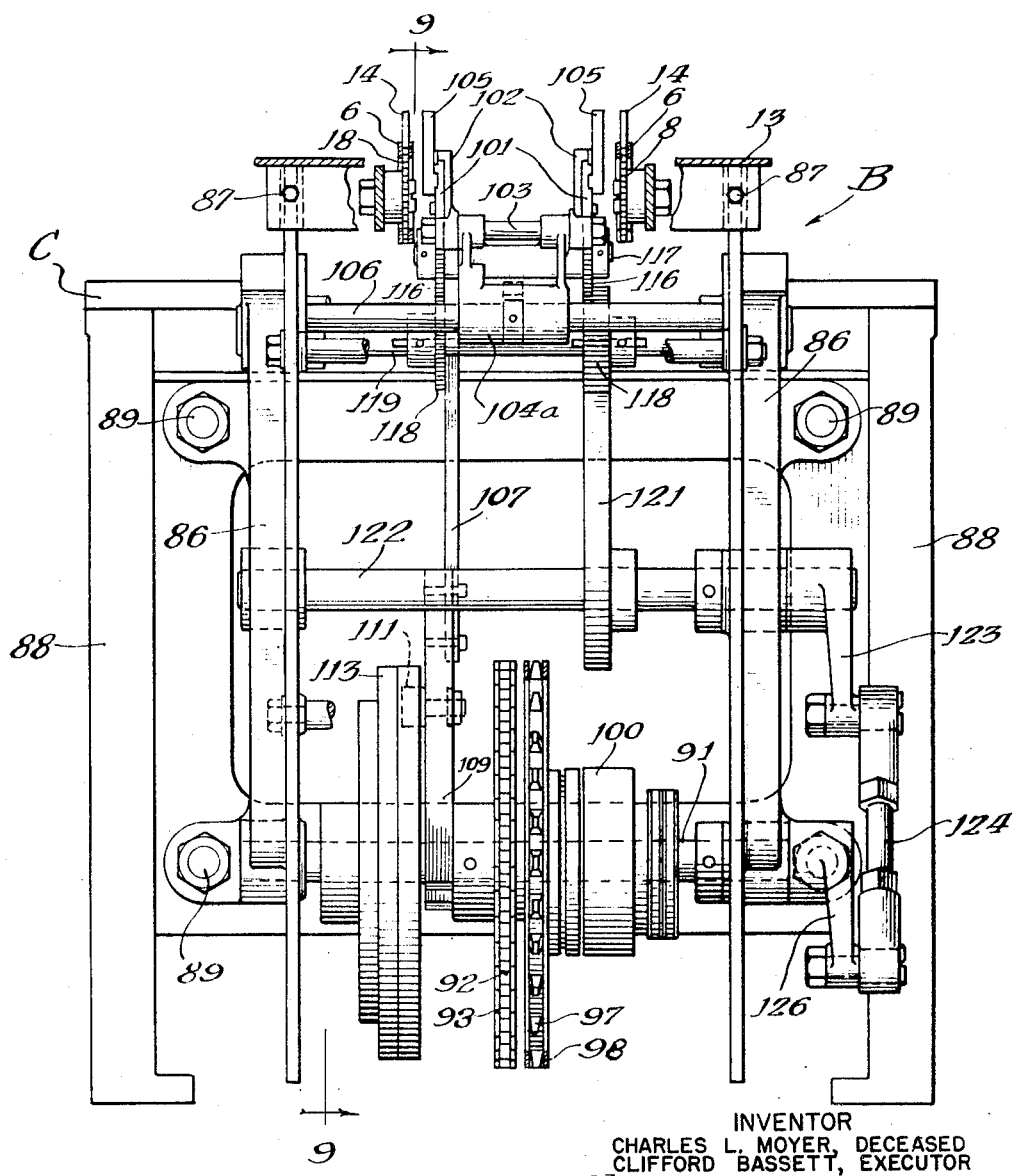

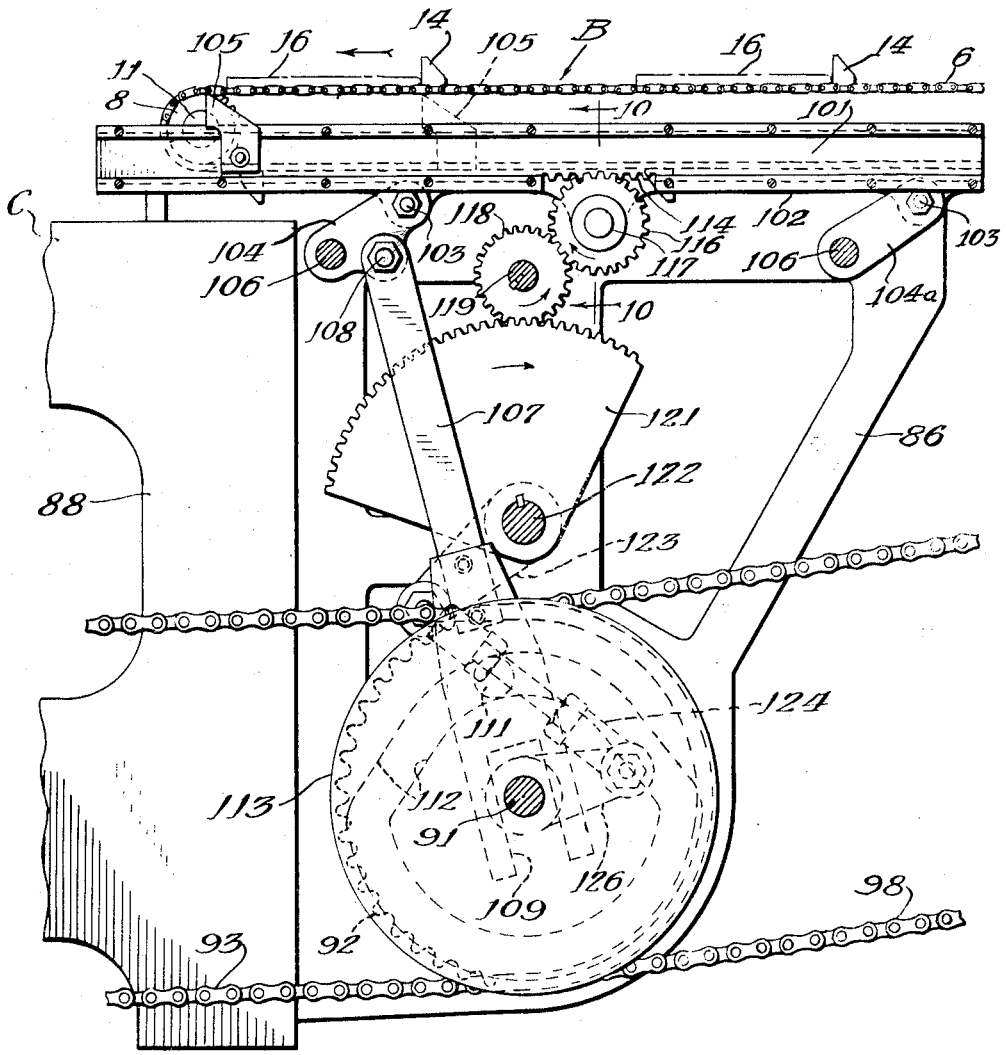

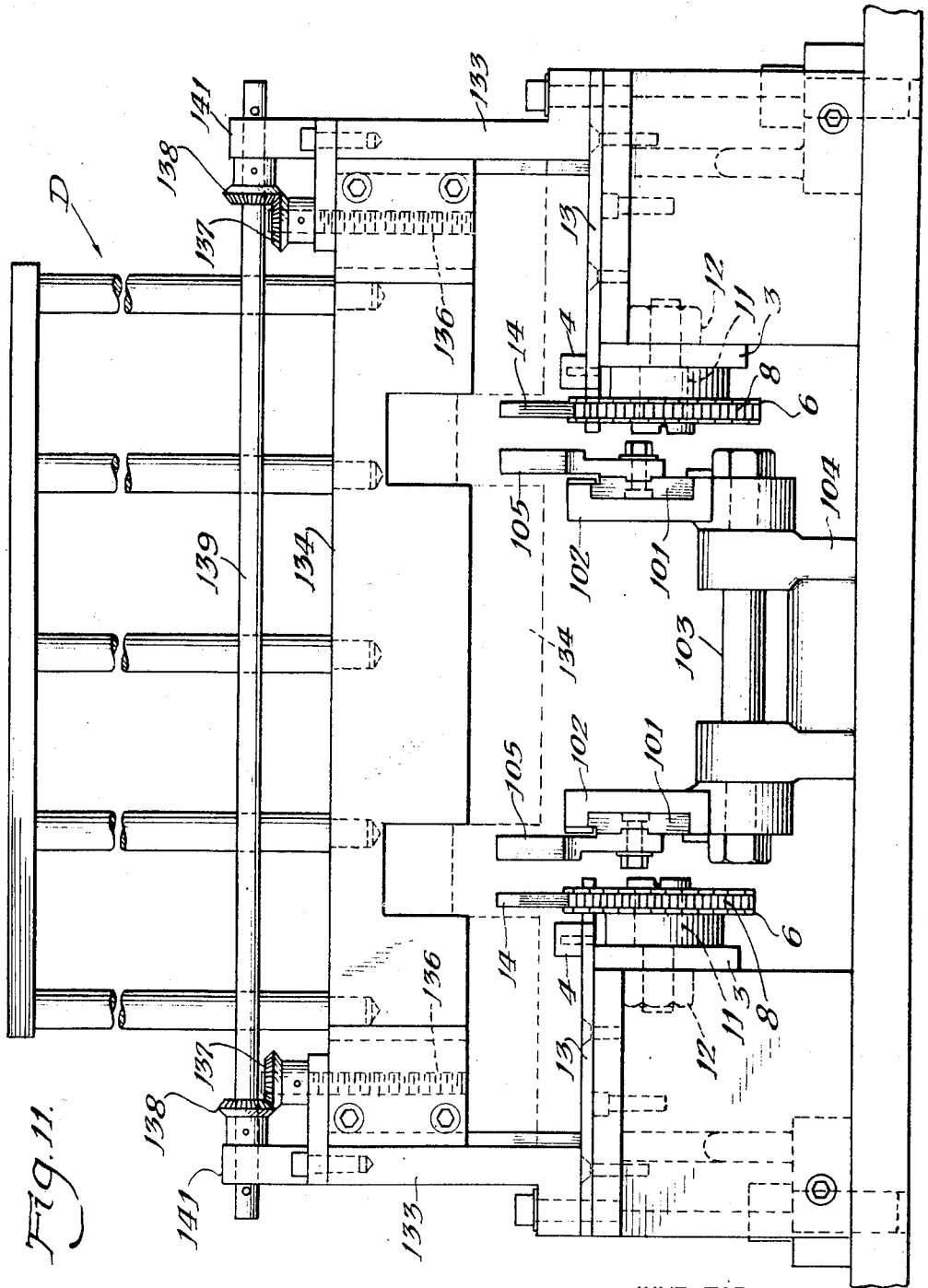

Patented Mar. 25, 1952

2,590,198

UNITED STATES PATENT OFFICE 2,590,198

FEED AND TRANSFER MECHANISM FOR BOOK-TRIMMING MACHINES

Charles L. Moyer, deceased, late of Chicago, Ill., by Clifford S. Bassett, executor, Chicago, Ill., assignor to C. L. Moyer Company, Chicago, Ill., a corporation of Illinois Original application December 22, 1947, Serial No. 793,076. Divided and this application May 5, 1949, Serial No. 91,622

3 Claims. (Cl. 198—24)

This application is a division of my co-pending application Serial No. 793,076 filed December 22, 1947, for Feed Mechanism for Book Trimming Machine.

This invention relates to feed mechanisms, and is more particularly concerned with the provision of a feed mechanism adapted for use in delivering books to a book trimming machine of the type employed to trim the head, foot and front edges of books.

The present invention contemplates the provision of a feed mechanism embodying a delivery table having a receiving station and a discharge station, and an endless conveyor for continuously moving books from the receiving station to the discharge station.

This invention further contemplates the provision of a book transfer mechanism for controlling the movement of books from a binding machine to the receiving station of the delivery table, said transfer mechanism being provided with stop members movable into and out of engagement with each book and in timed relation with the movement of the endless conveyor.

This invention further contemplates the provision of a book inserting mechanism for moving books from the discharge station to a book trimming machine of the type disclosed in my co-pending application, Serial No. 744,665, filed April 29, 1947 and now Patent No. 2,482,685 granted September 20, 1949.

This invention further contemplates the provision of a hopper located at the discharge end of the delivery table to receive a stack of untrimmed books for transfer to a trimming machine by means of the book inserting mechanism.

This invention embodies other novel features, details of construction, and arrangement of parts which are hereinafter set forth in the specification and claims and illustrated in the accompanying drawings wherein:

Fig. 1 is a side elevational view showing a feed mechanism embodying features of the invention.

Fig. 2 is a top plan view of same.

Fig. 4 is a top plan view of same.

Fig. 5 is a transverse sectional view taken along the line 5—5 of Fig. 3.

Fig. 6 is a longitudinal sectional view taken along the line 6—6 of Fig. 4.

Fig. 7 is an enlarged side elevational view showing the discharge station of the feed mechanism, the book hopper, and the book inserting mechanism for delivering books to a trimming machine.

Fig. 8 is a transverse sectional view taken along the line 8—8 of Fig. 7.

Fig. 9 is a longitudinal sectional view taken along the line 9—9 of Fig. 8.

Fig. 10 is a transverse sectional view taken along the line 10—10 of Fig. 9.

Fig. 11 is a transverse sectional view taken along the line 11—11 of Fig. 7.

Delivery table

Figure 3:
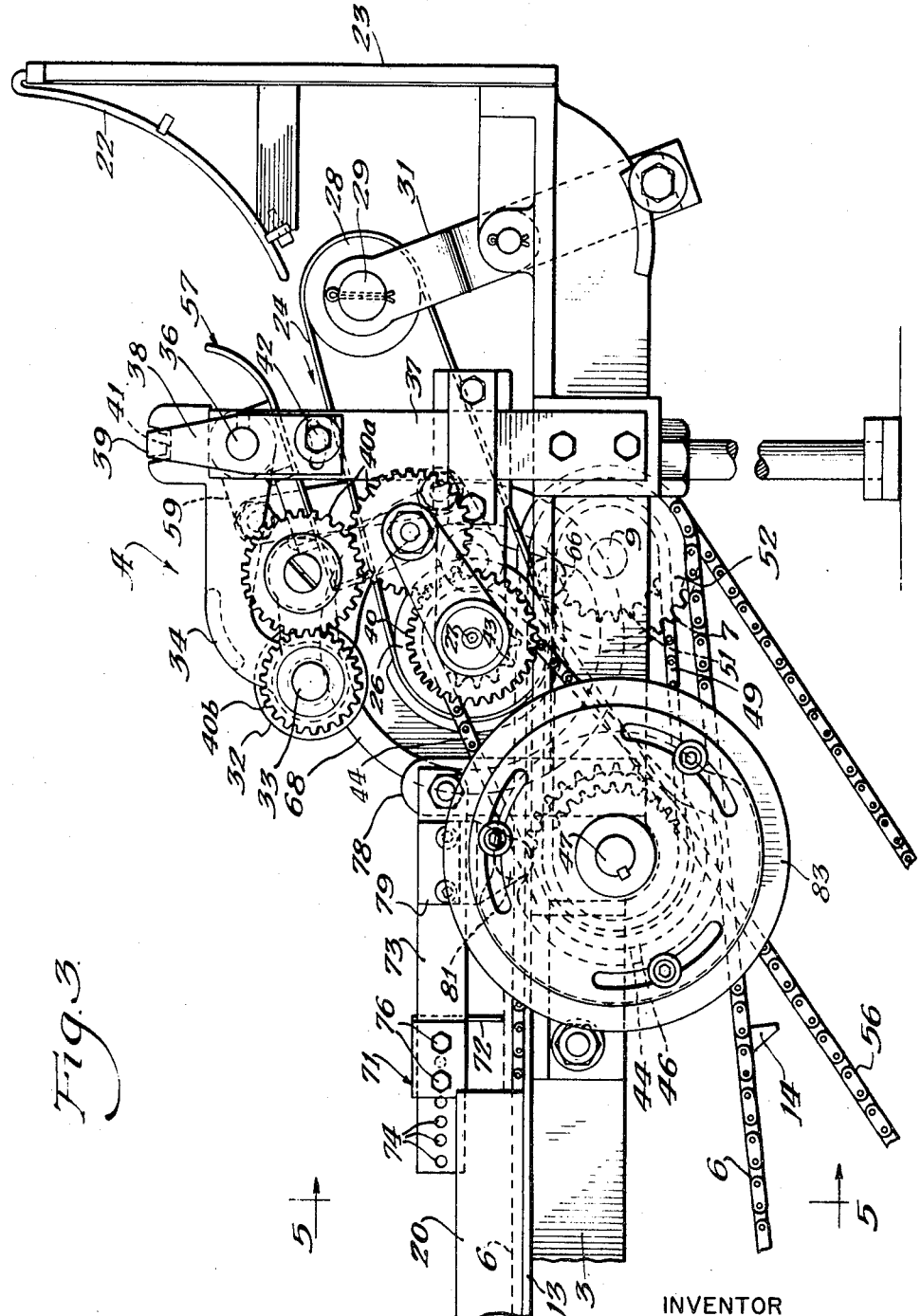
Fig. 3 is an enlarged side elevational view showing the receiving station of the feed mechanism, and the transfer mechanism for controlling the movement of books from a binding machine to the delivery table.

Referring now to the drawings for a better understanding of this invention, the feed mechanism for book trimming machines is shown as comprising a delivery table 2 having a pair of spaced longitudinally extending frame members 3—3 to support a pair of rails 4—4. A pair of endless conveyor chains 6—6 are mounted on driving sprockets 7—7 and driven sprockets 8—8, the driving sprockets being journaled on stud shafts 11—11. The drive shaft 9 is journaled in suitable bearing brackets 10—10 provided on the frame members 3—3, and the stud shafts 11—11 are secured to their respective frame members 3—3 by means of nuts 12.

The conveyor chains travel in a forward direction along the upper surfaces of a pair of flat plates 13—13 secured to the frame members 3—3, and are provided with push lugs 14 disposed at equally spaced intervals for engagement with books 16. Idler sprockets 17—17 and 18—18 are journaled on brackets 19—19 and 21—21, respectively, secured to the frame members 3—3, to take up the slack in the conveyor chains. A pair of centering plates 20—20 are secured to the plates 13—13 to converge inwardly from the receiving end to the discharge end of the delivery table 2 to center the books during movement of the latter along the rails 4—4. The centering plates are preferably formed angle-shaped, as illustrated in Fig. 5.

Transfer mechanism

Referring now to Figs. 1 to 6 in the drawings, a transfer mechanism A, for controlling the movement of untrimmed books from a binding machine (not shown) to the delivery table 2, is shown as comprising a chute 22 supported in an inclined plane by means of a bracket 23 secured to the frame members 3—3. The chute 22 may be formed of a plurality of rods, as illustrated in the drawings, or may be formed from a sheet of metal. A pair of endless conveyor belts 24—24 are mounted on driving pulleys 26—26, secured to a shaft 27, and idler pulleys 28—28 journaled on pins 29—29 provided on arms 31—31.

A pair of knurled rolls 32—32 are secured to a shaft 33 to co-act with the belts 24—24 to deliver books to the delivery table 2. The shaft 33 is journaled on the free end of a roll frame 34 journaled on a cross shaft 36.

The cross shaft 36 is journaled in suitable bearing brackets 37—37 which are secured to and extend upwardly from their respective frame members 3—3. The rolls 32—32 are supported in spaced relation to the belts 24—24 by means of an adjustment arm 38 which is journaled intermediate its ends on the shaft 36, the upper end of the adjustment arm being offset at 39 for engagement in a recess 41 formed in the roll frame 34. The lower end of the arm 38 is slotted to receive a locking screw 42 threaded into the adjacent bearing bracket 37, the slot being formed to permit angular adjustment of the arm 38 to vary the spacing between the knurled rolls 32—32 and the conveyor belts 24—24. The roll shaft 33 is driven from the shaft 27 by means of a driving gear 40, a pair of idler gears 40a—40a, and driven gear 40b.

A sprocket 43 is secured to the shaft 27 to be driven by a sprocket chain 44 leading to a sprocket 46 secured to a cam shaft 47. The cam shaft 47 is journaled in suitable bearings provided on the frame members 3—3, and has a sprocket 48 secured thereto to be driven by a chain 49 leading around a sprocket 51 secured to the shaft 9. A sprocket 52 is secured to the drive shaft 9 to be driven from a counter shaft 53 by a sprocket 54 and sprocket chain 56.

*Primary book stop mechanism*

Referring now more particularly to Figs. 1 to 6 in the drawings, a primary book stop mechanism is shown as comprising a primary stop plate 57, which is formed with a downwardly projecting abutment flange 58 for movement into and out of engagement with books 16 during their travel along the conveyor belts 24. The stop plate 57 is mounted on the ends of a pair of arms 59 and 61 which are secured to the cross shaft 36. One end of a connecting link 62 is pivotally connected to the free end of the arm 59, the other end of the link being pivotally connected to one arm of a bell crank lever 63 which is journaled on a stud shaft 64 secured to a frame member 3. A roller 66 is journaled on the end of the other arm of the bell crank lever 63 for engagement by the cam surfaces 67 formed in a box cam 68 secured to the shaft 27. As illustrated in Fig. 6, the cam surfaces 67 are formed to act through the bell crank lever 63 and connecting link 62 to move the abutment flange 58 into and then out of engagement with a book 16 during each revolution of the box cam.

*Secondary book stop mechanism*

A secondary book stop mechanism is shown as comprising a secondary stop plate 71 formed with a downwardly projecting abutment flange 72 for movement into and out of engagement with books being conveyed toward the discharge end of the receiving table 2 by means of the conveyor chains 6—6. The stop plate 71 is adapted to be adjustably positioned along the free ends of a pair of arms 73—73 by means of a plurality of threaded apertures 74 formed in the arms to receive locking screws 76—76. The inner ends of the arms 73—73 are journaled on shoulder screws 77—77 threaded into brackets 78—78. Roller brackets 79—79 are secured to the arms 73—73 and provided with journals to receive cam rollers 81—81 for engagement by cams 82 and 83 secured to shaft 47. The cams 82 and 83 are formed with similar cam surfaces to act through their respective arms 73—73 to alternately raise and lower the secondary stop plate 71, as illustrated in Fig. 6.

*Book inserting mechanism*

Referring now more particularly to Figs. 7 to 11 in the drawings, the book inserting mechanism B is shown as comprising side frames 86—86 which are secured to the ends of the frame members 3—3 by means of screws 87. The side frames are adapted to be secured to the frame 88 of a book trimming machine, generally indicated at C, by means of bolts or screws 89. A drive shaft 91, journaled in suitable bearings provided in the side frames 86—86, is secured to a sprocket 92 driven by an endless chain 93 which leads around a sprocket 94 keyed to a trimmer drive shaft 96. A sprocket 97 is also secured to the shaft 91 to drive an endless chain 98 leading to a sprocket 99 keyed to the shaft 53. To insure against breakage of parts, a friction clutch 100 is preferably interposed between the shaft 91 and sprockets 92 and 97.

A pair of lug carriers 101—101 are mounted for reciprocal movement along a pair of carrier frames 102—102 which are supported in spaced parallel alignment upon a pair of cross shafts 103—103. Each of the carriers 101 is provided with a lug 105 extending upwardly for engagement with books traveling along the receiving table 2. The shafts 103—103 are journaled on the free ends of rocker links 104 and 104a which are journaled at their inner ends on cross shafts 106—106 secured to the side frames 86—86. An actuating arm 107 is pivotally connected at 108 to the rocker link 104, and has its other end bifurcated at 109 to straddle the shaft 91. A roller 111 is journaled on the side of the arm 107 for engagement by the cam surfaces 112 of a box cam 113 keyed to the shaft 91.

Rack teeth 114 are formed along the lower edges of the lug carriers 101 for meshing engagement with a pair of planetary gears 116 secured to a shaft 117 which is journaled on the carrier frames 102—102. A pair of sun gears 118—118 are keyed to a shaft 119 which is journaled at its ends in the side frames 86—86. The sun gears 118—118 mesh with their respective planetary gears 116—116. A fan gear 121 is keyed to a crank shaft 122 to drive one of the sun gears 118, and a crank 123 is keyed to one end of the shaft 122 for pivotal engagement with one end of a connecting rod 124 which has its other end pivotly connected to a crank 126 keyed to the shaft 91. As illustrated in Figs. 1, 7 and 11 in the drawings, a hopper D is provided above the inserting mechanism B to receive a stack of books 16 for delivery to the trimming machine C when books are not being supplied from a binder to the transfer mechanism A. The hopper comprises a base 131 secured to the side frames 86—86 to support a plurality of vertically disposed rods 132 defining the sides and one end of the hopper. A pair of gate brackets 133—133 are secured to their respective side frames 86—86 to support and guide a vertically adjustable gate 134. The gate is adjustable vertically by means of a pair of adjustment screws 136—136 journaled on their respective gate brackets 133—133. Bevel gears 137—137 are secured to the upper ends of the adjustment screws 136—136 for meshing engagement with a pair of bevel gears 138—138 secured to an operating shaft 139 journaled in bearings 141—141. The operating shaft 139 is adapted to be manually rotated, to adjust the position of the gate 134, by means of a suitable wrench or crank (not shown).

*Operation*

In the operation of the feed mechanism shown and described, books 16 are delivered to the delivery table 2 by means of the transfer mechanism, generally indicated at A. The books 16 are delivered onto the chute 22 for movement by gravity onto the endless conveyor belts 24 which act to move the books inwardly against the abutment shoulder 58 of the primary stop member 57. During each revolution of the box cam 68, the abutment shoulder 58 is moved upwardly out of engagement with the forward edge of a book by means of the bell crank lever 63, connecting link 62 and arm 59. When a book is released by the primary stop member 57, it moves downwardly between the conveyor belts 24 and the co-acting rolls 32 for delivery onto the conveyor chains 6—6 of the delivery table 2. During forward movement of the endless conveyor chains 6—6, a book is brought into engagement against the abutment flange 72 of the secondary stop member 71 and is held against forward movement until a set of push lugs 14 move into engagement against the other edge of the book. The cams 82 and 83 then act against their respective rollers to pivot the stop arms 73—73 upwardly to permit a book to pass under the abutment shoulder 72.

As more clearly illustrated in Fig. 9, the endless conveyor chains 6—6 convey the books 16 in equally spaced relation to the inserting mechanism generally indicated at B. The lug carriers 101—101 are reciprocated in their respective carrier frames 102—102 by means of the crank 126, connecting link 124, arm 123, fan gear 121 and gears 118 and 116, the latter gears acting through the rack teeth 114 formed on the lower edges of the lug carriers. During rearward movement of the lug carriers 101—101, the carrier frames 102—102 are disposed in their lower positions to permit the push lugs 105—105 to pass rearwardly under a book 16. The carrier frames 102—102 are moved upwardly by means of the cam 113 which acts through the roller 111, actuating arm 107, and rocker links 104 and 105 to position the push lugs 105—105 behind a book 16. Carrier frames 102—102 are maintained in their raised position during forward movement of the lug carriers 101. The lugs 105—105 act to push each book, or set of books, into position to be trimmed by the first knife, or set of knives, provided on the trimming machine C. It will, of course, be understood that the feed mechanism must be operated in timed relation with the trimming machine in order that one book, or set of books, will be delivered to the trimming machine during each cutting cycle of the trimmer.

A supply of untrimmed books may be delivered to the delivery table 2 by means of a hopper D. As illustrated more clearly in Figs. 7 and 11, the hopper may be provided with an adjustable gate 134 to control the movement of books from the lower end of the hopper.

While this invention has been shown in but one form, it is obvious to those skilled in the art that it is not so limited but is susceptible of various changes and modifications without departing from the spirit and scope of the claimed invention.

What is claimed is:

1. In a book feed mechanism, an endless conveyor having an upper flight disposed to carry books, a carrier frame disposed below and parallel to said upper flight, rocker links to support said carrier frame for movement toward and away from said upper flight, a lug carrier guided for reciprocative movement along said carrier frame, a lug secured on said carrier to engage a book on said upper flight when said carrier frame is moved toward said upper flight, rack teeth provided on said lug carrier, a planetary gear journaled on said carrier frame to engage said rack teeth, a sun gear to drive said planetary gear, a fan gear to drive said sun gear, means to actuate said fan gear to impart reciprocative movement to said lug carrier, and means to move said carrier frame toward and away from said upper flight.

2. In a book feed mechanism, an endless conveyor having an upper flight disposed to carry books, a carrier frame disposed below and parallel to said upper flight, rocker links to support said carrier frame for movement toward and away from said upper flight, a lug carrier guided for reciprocative movement along said carrier frame, a lug secured on said carrier to engage a book on said upper flight when said carrier frame is moved toward said upper flight, rack teeth provided on said lug carrier, a planetary gear journaled on said carrier frame to engage said rack teeth, a sun gear to drive said planetary gear, a fan gear to drive said sun gear, crank means to actuate said fan gear to impart reciprocative movement to said lug carrier, and cam means to move said carrier frame toward and away from said upper flight.

3. In a book feed mechanism, an endless conveyor having an upper flight disposed to carry books, a carrier frame disposed below and parallel to said upper flight, rocker links to support said carrier frame for movement toward and away from said upper flight, a lug carrier guided for reciprocative movement along said carrier frame, a lug secured on said carrier to engage a book on said upper flight when said carrier frame is moved toward said upper flight, rack teeth provided on said lug carrier, a planetary gear journaled on said carrier frame to engage said rack teeth, a sun gear to drive said planetary gear, a fan gear to drive said sun gear, crank means to actuate said fan gear to impart reciprocative movement to said lug carrier, cam means to move said carrier frame toward and away from said upper flight, and means to move said conveyor, carrier frame and lug carrier in timed relation.

CLIFFORD S. BASSETT,
*Executor of the Estate of Charles L. Moyer, Deceased.*

REFERENCES CITED

The following references are of record in the file of this patent:

UNITED STATES PATENTS

| Number | Name | Date |
| --- | --- | --- |
| 1,680,996 | Kitchel et al. | Aug. 14, 1928 |
| 1,868,844 | Nahler | July 26, 1932 |
| 2,346,511 | Schmitt | Apr. 11, 1944 |

FOREIGN PATENTS

| Number | Country | Date |
| --- | --- | --- |
| 614,078 | Germany | June 1, 1935 |